United States Patent
Smith

(10) Patent No.: US 7,986,263 B2
(45) Date of Patent: Jul. 26, 2011

(54) METHOD AND APPARATUS FOR A GLOBAL NAVIGATION SATELLITE SYSTEM RECEIVER COUPLED TO A HOST COMPUTER SYSTEM

(75) Inventor: Vincent Maddock Smith, Langley (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 208 days.

(21) Appl. No.: 12/402,204

(22) Filed: Mar. 11, 2009

(65) Prior Publication Data

US 2010/0073228 A1 Mar. 25, 2010

Related U.S. Application Data

(60) Provisional application No. 61/099,081, filed on Sep. 22, 2008.

(51) Int. Cl.
*G01S 19/39* (2010.01)
(52) U.S. Cl. .................................. 342/357.22
(58) Field of Classification Search ............. 342/357.22, 342/377
See application file for complete search history.

(56) References Cited

U.S. PATENT DOCUMENTS

| | | | |
|---|---|---|---|
| 5,629,708 A | 5/1997 | Rodal et al. | |
| 5,798,732 A | 8/1998 | Eshenbach | |
| 5,808,581 A | 9/1998 | Braisted et al. | |
| 5,854,605 A | 12/1998 | Gildea | |
| 5,893,044 A | 4/1999 | King et al. | |
| 6,007,372 A | 12/1999 | Wood | |
| 6,959,198 B2 | 10/2005 | Mitsugi | |
| 7,072,631 B2 | 7/2006 | Kitatani | |
| 7,236,883 B2 | 6/2007 | Garin et al. | |
| 2005/0052317 A1* | 3/2005 | McBurney et al. | 342/357.1 |
| 2007/0090994 A1 | 4/2007 | Young | |
| 2007/0268180 A1 | 11/2007 | Zhi et al. | |

FOREIGN PATENT DOCUMENTS

WO 2007112582 A1 11/2007

OTHER PUBLICATIONS

"timetools" GPS clock: retrieved from http://www.timetools.co.uk/atomic-clock/fw/gpsclock.htm, on May 15, 2009, 2 pages.
"SiRFstarIII GSD3t High Performance, Satellite Signal Processor, Host Coupled Single Die Product Overview," retrieved from http://www.sirf.com/products/GSD3t_Product_Insert.pdf, 2 pages.
"subATTOTM Indoor GPS—Pitfalls, Solutions and Performance Using a Conventional Correlator," Rod Bryant, Sigtec Navigation Pty Ltd. http://www.signav.com, 20 pages.

(Continued)

*Primary Examiner* — Thomas H Tarcza
*Assistant Examiner* — Harry Liu

(57) ABSTRACT

The present invention provides a global navigation satellite system (GNSS) receiver apparatus, such as a GPS receiver, operable with a host computer system equipped with a real time clock configured to provide a time signal to the GNSS receiver apparatus. The time signal is used to facilitate acquisition of navigation and global timing information through observation of satellite signals. The global timing information is used to adjust the time signal and/or the real time clock to improve subsequent acquisitions of navigation and global timing information.

34 Claims, 5 Drawing Sheets

OTHER PUBLICATIONS

"gpsd" Wikipedia entry for GPS receiver daemon, http://en.wikipedia.org/wiki/Gpsd, Version of Jan. 31, 2008 9:59:42 AM, 1 page.

"Assisted GPS using Cellular Telephone Networks for GPS Anywhere," R. Bryant, GPS World, May 2005, www.gpsworld.com, 7 pages.

"GPS 15 Technical Specifications," 190-00266-00, Revision B, Garmin International Inc., Apr. 2004, http://www.garmin.com/manuals/GPS15_TechnicalSpecification.pdf, 28 pages.

"Overview of low-cost GPS receivers which output raw data," retrieved from http://home-2.worldonline.nl/~samsvl/oemtable.htm on Feb. 26, 2008, 5 pages.

* cited by examiner

METHOD AND APPARATUS FOR A GLOBAL NAVIGATION SATELLITE SYSTEM RECEIVER COUPLED TO A HOST COMPUTER SYSTEM

RELATED APPLICATIONS

The present application claims priority to U.S. Provisional Patent Application 61/099,081 filed Sep. 22, 2008, which is hereby incorporated by reference.

FIELD OF THE INVENTION

The present invention pertains in general to global navigation satellite system (GNSS) receivers such as Global Positioning System (GPS) receivers, and in particular to GNSS receivers which can be coupled to a host computer system to provide mutual functional support.

BACKGROUND

Global navigation satellite systems (GNSS) such as the global positioning system (GPS) are widely used to obtain accurate location information based on the observation of satellite signals. This location information can be used directly for navigation or provided to other devices such as computers or communication terminals to provide enhanced functionality.

A particular challenge upon start-up of a GPS receiver is obtaining a first position fix in a timely manner. This challenge stems from the fact that, given a relatively unknown position, highly accurate time information is required by the GPS receiver in order to locate and interpret satellite signals in a timely manner. In particular, accurate timing information may be required to accurately predict and/or interpret almanac, ephemeris, and navigation signal data and associated signal delays therein indicative of satellite range. However, it is currently not feasible to provide a local clock which can maintain sufficient accuracy for this purpose, particularly between successive activations of the GPS receiver.

U.S. Pat. No. 5,893,044 discloses an apparatus for improving the acquisition time of GPS signals including a GPS receiver and a real-time clock circuit. The GPS receiver receives GPS signals including a precision time reference signal for providing a position based upon the location of the GPS receiver. The GPS receiver also includes an internal time base derived from the precision time reference signal. The real-time clock circuit is coupled to the GPS receiver for receiving a first time reference signal from the GPS receiver when the precise time reference signal of the GPS signal is available and for providing a second time reference signal to the GPS receiver when the precision time reference signal of the GPS signal is not available thereby allowing a fast acquisition time of GPS signals when the GPS signals are temporarily interrupted or not yet available.

United States Patent Application Publication No. US 2007/0268180 discloses a generic navigation satellite system signal receiver having a fast time to first fix by calibrating a low power always-on real time clock (RTC). The receiver includes an RTC calibrator having a fraction calculator and a time expander. Before the receiver is powered off, the fraction calculator uses the fine resolution of a GNSS time signal for determining a time fraction for RTC time. When the receiver is powered back on, the time expander uses an estimate of RTC time drift during the time that GNSS receiver had power off and the time fraction for calibrating and increasing the resolution of the RTC time for an RTC time tick. A signal navigation processor uses the calibrated RTC time for assisting a first fix with code phase search, integration time periods, resolution of epoch integer and/or location-in-space of GPS satellites.

A problem with the above solutions is that they require a dedicated local clock. However, it may not be feasible for some GNSS or GPS-enabled devices to incorporate such a clock. For example, GPS adapters and GPS-enabled wireless adapters for use with a host computer system may not incorporate a dedicated local clock due to constraints such as cost, power, and space.

Another method for obtaining an accurate time signal for a position fix operation is to obtain the time signal from a terrestrial network, for example a wireless network. For example, U.S. Pat. No. 7,236,883 discloses an aided GPS subsystem within a wireless device, the wireless device receiving an external clock signal which is forwarded to the GPS subsystem. However, reliance on an external network can increase cost and complexity of the device, and is subject to network service availability which may not exist in remote locations.

Therefore, there is a need for a new method and apparatus for a global navigation satellite system receiver coupled to a host computer system.

SUMMARY OF THE INVENTION

An object of the present invention is to provide a global navigation satellite system receiver apparatus configured for operative coupling to a host computer system, the global navigation satellite system receiver apparatus comprising: a navigation interface module configured to receive a host time signal from the host computer system during a navigation operation, the navigation interface module further configured to provide a navigation time signal based on at least the host time signal during said navigation operation; and a satellite signal receiver module configured to use the navigation time signal to facilitate determination of a global time signal through reception of satellite signals during said navigation operation; wherein the global time signal is provided to the navigation interface module during an update operation, the navigation interface module configured to use at least the global time signal to configure one or more adjustments during said update operation, said one or more adjustments configured to facilitate future navigation operations.

In accordance with an aspect of the present invention, there is provided a method of operating a global navigation satellite system receiver apparatus operatively coupled to a host computer system, the method comprising: performing a navigation operation, the navigation operation comprising: providing a navigation time signal based on at least a host time signal from the host computer; using the navigation time signal to perform a satellite signal reception operation; and determining a global time signal at least in part based on information obtained from the satellite signal reception operation; and using at least the global time signal to perform one or more adjustments to facilitate future navigation operations.

In accordance with an aspect of the present invention, there is provided a global navigation satellite system (GNSS) enabled system comprising: a host computer module operatively coupled to a host real time clock, the host real time clock configured to provide a host time signal; and a global navigation satellite system receiver apparatus operatively coupled to the host computer module, the global navigation satellite system receiver apparatus comprising: a navigation interface module configured to receive the host time signal during a navigation operation, the navigation interface module further configured to provide a navigation time signal based on at least the host time signal during said navigation operation; and a satellite signal receiver module configured to use the navigation time signal to facilitate determination of a global time signal through reception of satellite signals during said navigation operation; wherein the global time signal is provided to the navigation interface module during an update operation, the navigation interface configured to use at least the global time signal to configure one or more adjustments during said update operation, said one or more adjustments configured to facilitate future navigation operations.

DETAILED DESCRIPTION OF THE INVENTION

Definitions

Figure 1:
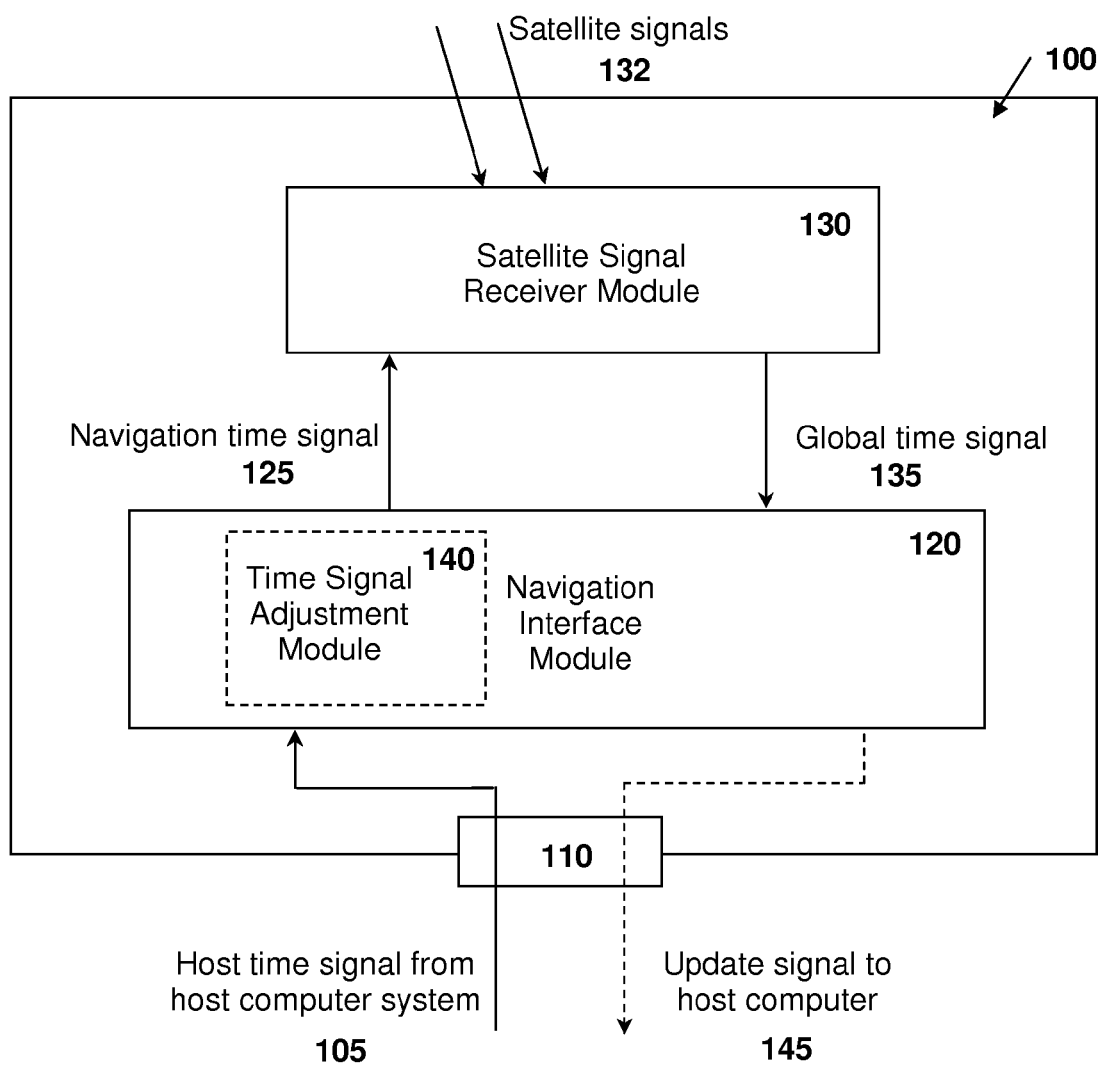
FIG. 1 illustrates a GNSS receiver apparatus according to an embodiment of the present invention.

The term "global navigation satellite system," or GNSS, refers to a generic satellite or pseudolite assisted navigation system in which electronic receivers can determine their location with specified accuracy using line-of-sight radio signals transmitted by satellites. Determination of and/or synchronization with time as perceived by the satellites is also possible in this manner. Existing GNSS systems with global availability include GPS (global positioning system) and the partially operational GLONASS. GNSS systems can also have regional availability, such as China's Beidou system and India's IRNSS system. Future GNSS systems include the European Galileo system and Beidou-2 as well as other possible systems or combinations of various systems.

The term "time signal" refers to a time-varying signal defined over a time interval, such as a radio or electrical signal, which is indicative of the passage of time according to a prespecified format, such as coordinated universal time (UTC), GPS time, temps atomique international (TAI), local time, or Greenwich mean time (GMT). Two time signals are considered substantially synchronized within a time interval if they are substantially simultaneously indicative of the same passage of time within the time interval according to the same time format.

The term "real time clock," or RTC, refers to an electronic timekeeping device which can be used to provide a time signal substantially indicative of current time according to a prespecified format, such as coordinated universal time (UTC), GPS time, temps atomique international (TAI), local time, or Greenwich mean time (GMT). For a free-running RTC, the time signal may not be exactly indicative of the relevant current time, but may be considered to be indicative of said time with a predetermined accuracy and/or precision, which may vary in time due to accumulated clock inaccuracies, power events, temperature variations, component variations, clock adjustment events, or the like. A typical RTC, for example as found in a personal computer, can include a crystal oscillator circuit, one or more counters, and one or more power sources.

As used herein, the term "about" refers to a ±5% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a global navigation satellite system (GNSS) receiver apparatus, for example a GPS adaptor or GPS-enabled wireless adapter, which is configured for operative coupling to a host computer system. The host computer system provides a host time signal, for example from a host real time clock, which is supplied for use by the GNSS receiver apparatus. The GNSS receiver apparatus comprises a navigation interface module, which is configured to receive the host time signal during a navigation operation, as required for spatial and/or temporal navigation purposes. The navigation interface module is further configured to provide a navigation time signal based on at least the host time signal during the navigation operation. For example, the navigation time signal can be substantially a replica of the host time signal, or an adjusted version of the host time signal configured to reduce timing inaccuracies based on information about the host real time clock accuracy or inaccuracy, clock drift, clock skew, etc.

The GNSS receiver apparatus further comprises a satellite signal receiver module which is configured to use the navigation time signal to facilitate determination of a global time signal through reception of satellite signals during the navigation operation. The navigation time signal can represent an a priori time measurement, whereas the global time signal can represent a time measurement substantially synchronized to time as kept by the satellites. The global time signal acquired during the navigation operation is provided to the navigation interface module during an update operation, in order that the global time signal may be used to configure one or more adjustments directly or indirectly relevant to the navigation time signal. These adjustments are configured to facilitate future navigation operations, for example by facilitating substantial synchronicity between the navigation time signal and the global time signal. This can aid, for example in facilitating speed and/or efficiency of future navigation operations. For example, the adjustments can comprise providing an update signal to the host computer, in order that the host real time clock can be adjusted to substantially synchronize the host time signal and the global time signal during the update operation. As another example, the adjustments can comprise adjusting a manner in which the navigation time signal is provided based on at least the host time signal, for example by adjusting parameters or schema used to derive the navigation time signal from the host time signal, such as parameters relevant to the host real time clock accuracy, drift, etc. A host computer module can also be provided, for example within the host computer system, which can be configured to facilitate one or more adjustments during the update operation.

Host Computer System

The host computer system to which the GNSS receiver apparatus is coupled can be a personal computer such as a laptop computer, portable or semi-portable desktop computer, or other computing device such as a PDA (personal digital assistant), automobile computer, cellular telephone, or the like.

The host computer system includes a host real time clock. This clock can be configured to supply aspects of the computer system with a time signal indicative of time as kept by the host clock for various purposes. For example, the clock can supply a time signal to software modules, operating systems, or hardware modules such as network interface cards. The time signal is also provided to the GNSS receiver apparatus through a computer interface such as a USB™, FIREWIRE™, Bluetooth™, IEEE 802.11, IEEE 802.15.4, ZigBee™, PC Card™, PCMCIA™, ExpressCard™, or other standard or non-standard wired or wireless interface.

In an embodiment, hardware or software means can be provided in the host computer for adjusting the host real time clock in response to one or more events. For example, the operating system may be capable of initiating adjustment of the host real time clock automatically or according to the input of a user. A network interface card may also be capable of initiating adjustment of the host real time clock in response to a signal from the network. Furthermore, the GNSS receiver apparatus may provide a signal which initiates or facilitates adjustment of the host real time clock.

In an embodiment, if the host real time clock can be adjusted in response to a signal from more than one origin, the host time signal provided to the GNSS receiver apparatus may not be guaranteed accurate, even within prespecified tolerance limits. For example, if another hardware or software application adjusts the host real time clock, the host real time clock may become substantially useless for the purposes of operating the GNSS receiver apparatus until the clock is corrected.

In an embodiment of the present invention, in order to correct the above-mentioned problem of the host real time clock being adjustable from multiple sources, the present invention provides for a clock gateway module configured to reduce the impact of multiple applications adjusting the host clock. For this purpose, the clock gateway module can manage one or more adjustments of the host real time clock, for example as initiated due to embodiments of the present invention, or due to other sources such as concurrently running hardware or software applications on the host computer system or peripherals thereof.

In an embodiment, a hardware or software module can act as a clock gateway module for incoming communication addressing the host real time clock. Operations intended to adjust the clock can be logged by the clock gateway module, such that changes detrimental to operation of the GNSS receiver apparatus can be detected. In addition, cumulative amounts by which the host real time clock is to be adjusted can be recorded and tracked for different applications by the clock gateway module, thereby allowing the host time signal to be corrected such that it can be used effectively by the GNSS receiver apparatus.

In an embodiment, the clock gateway module can be configured to provide a selected application specific host time signal to each different hardware or software module requiring a host time signal. In particular, the host time signal can be sent to the clock gateway module, which adjusts the host time signal according to an adjustment contained in memory for each application specific host time signal. The application specific host time signals are then made available to the appropriate modules as a replacement to the original host time signal. Signals intended to adjust the host real time clock originating from the different hardware or software modules may not directly adjust, for example, timekeeping means such as hardware or software counters operatively coupled to an oscillator circuit, but may instead adjust the adjustment contained in memory associated with the clock gateway module for a selected application specific host time signal. Alternatively, the clock gateway module can contain separate adjustable timekeeping means such as hardware or software counters for different application specific host time signals. In this manner, the host real time clock as seen by the GNSS receiver apparatus can remain substantially unaffected except for example by adjustments which are logged and recorded by the clock gateway module, as described previously, to allow for host time signal correction. As such, the application specific host time signals are substantially independent of each other, in the sense that each can be provided and adjusted independently without affecting the others.

In an embodiment, the clock gateway module can provide corrections to the host real time clock, for example to increase accuracy of the host time signal as seen by the GNSS receiver apparatus. For example, clock drift measurements, clock skew measurements, temperature variation measurements, and the like, can be used to provide corrections to the host real time clock or the host time signal in order to more accurately align the host time signal as seen by the GNSS receiver apparatus with the global time signal, both during and between uses thereof. In this manner, the host time signal can be made more accurate, thereby improving operation of the GNSS receiver apparatus.

In an embodiment, corrections provided by the clock gateway module can be facilitated by measuring one or more aspects of the host time signal, such as differences between the host time signal and the global time signal. These aspects of the host time signal can be measured by periodically comparing the host time signal to a reference signal such as the global time signal, and measuring errors or inaccuracies, or linear or nonlinear trends thereof, in the host time signal by linear or nonlinear interpolation, regression analysis, least squares, recursive least squares, filtering such as Kalman filtering, extended Kalman filtering, particle filtering, recursive Bayesian estimation, or other methods as would be understood by a worker skilled in the art. The measured errors or inaccuracies or trends thereof can then be used to adjust the host time signal to increase the accuracy thereof, or they can be used to provide correction factors when using the host time signal, for example during acquisition of satellite signals. For example, linear or nonlinear feedback control methods such as PID control or linear-quadratic regulator control can be used for this purpose. For example, if the host real time clock were measured as running fast by 2 ms per second (for example at a substantially constant nominal temperature), and it has been determined that the host real time clock has not been adjusted for 60 seconds, then the host real time clock can be adjusted back by 120 ms to compensate for clock drift (for example by rewriting the clock memory or direct manipulation of the real time clock circuit or shift registers). Alternatively in this example, the host time acquisition module or satellite system receiver module can be configured to incorporate a delay of 120 ms into the host time signal when using or transmitting same. As another example, fixed delays, such as delays related to clock skew, can be compensated by advancing the host real time clock such that the host time signal does not exhibit a delay when it is received at the GNSS. That is, if there is substantial delay in propagating the host time signal, the host real time clock can be set to provide an accurate time measurement at the GNSS receiver apparatus, as opposed to in the host computer system.

GNSS Receiver Apparatus

The GNSS receiver apparatus is an electronic device for use with the host computer system, and is configured to receive and interpret satellite signals in order to derive information such as a location fix and a global time signal indicative of time as kept by the GNSS according to a prespecified format. The GNSS receiver apparatus can also have further functionality, such as wireless communication functionality or other functionality as would be understood by a worker skilled in the art. The GNSS receiver apparatus can be operatively coupled to the host computer system using an interface such as USB™, FIREWIRE™, Bluetooth™, IEEE 802.11, IEEE 802.15.4, ZigBee™, PC Card™, PCMCIA™, ExpressCard™, or other standard or non-standard interface. The operative coupling facilitates access to the host time signal by the GNSS receiver apparatus during a navigation operation, which can be used to facilitate satellite signal reception. The global time signal obtained by the GNSS receiver apparatus is used to configure one or more adjustments configured to facilitate future navigation operations, as described herein.

In various embodiments of the present invention, the GNSS receiver apparatus can comprise various electronics components, for example as known in the art, configured to facilitate operation of the GNSS receiver apparatus. For example, the GNSS receiver apparatus can comprise a processor such as a CPU, volatile or non-volatile memory, logic circuits, communication devices, integrated circuits such as ASICs and FPGAs, and radio signal reception, amplification, demodulation and decoding devices.

In an embodiment, facilitating the navigation operation comprises facilitating substantial synchronicity between the navigation time signal and the global time signal. For example, aspects of the host computer system, host real time clock or navigation interface module can be adjusted so that when the navigation time signal is provided for the satellite signal reception operation, efforts have been made to make it an accurate representation of the global time signal. Generally speaking, a more accurate navigation time signal can expedite the satellite signal reception operation. Other methods of facilitating future navigation operations would be understood by a worker skilled in the art.

In an embodiment, the operative coupling can facilitate other operations such as powering of the GNSS receiver apparatus by the host computer system, and/or transfer of location data from the GNSS receiver apparatus to the host computer system for use by applications residing thereon.

The GNSS receiver apparatus according to embodiments of the present invention can include: an interface for coupling with the host computer system; a navigation interface module; and a satellite signal receiver module, for example as described herein. In an embodiment, the navigation interface module also comprises a time signal adjustment module.

In embodiments of the present invention, the navigation interface module is configured to receive a host time signal from the host computer system during a navigation operation. For example, the host computer system can route a signal representative of the host time signal to the interface with the GNSS receiver apparatus during the navigation operation, either periodically or in response to a request such as generated by the GNSS receiver apparatus. The signal representative of the host time signal can be transmitted in accordance with the standards for the interface between the host computer system and the GNSS receiver apparatus.

In embodiments of the present invention, the navigation interface module is further configured to provide a navigation time signal based on at least the host time signal. For example, the navigation time signal can be a substantial replica of the host time signal if the host time signal is considered accurate, or it can be an adjusted version of the host time signal configured to reduce timing inaccuracies based on information about the host real time clock accuracy, drift, skew, clock adjustment events, etc. The navigation interface module can further be configured to provide the navigation time signal in a format usable by the satellite signal receiver module.

The satellite signal receiver module is operatively coupled to the navigation interface module, and is configured to use the navigation time signal to facilitate determination of a global time signal through reception of satellite signals during the navigation operation.

Typically, as is known in the art, a GNSS receiver determines a global time signal, along with information indicative of current geographic location, through processes such as trilateration, multilateration, triangulation, or the like. For example a GNSS receiver, such as a GPS receiver, can determine the global time signal and location by obtaining a collection of pseudorange measurements. Each pseudorange measurement is obtained by correlating a locally generated pseudorandom code sequence with a corresponding (for example, substantially identical but time shifted) pseudorandom code sequence transmitted by a selected satellite. Generation of the locally generated pseudorandom code sequence begins at a predetermined time according to the navigation time signal. Transmission of the pseudorandom code sequence transmitted by the selected satellite begins at predetermined times according to the global time signal. By time shifting the locally generated pseudorandom code sequence and observing the resulting correlation with the pseudorandom code sequence received from the satellite, the GNSS receiver can measure the propagation delay of the signal from the satellite, assuming that the navigation time signal is synchronized to the global time signal. Multiplying this propagation delay by the speed of light yields a pseudorange measurement, indicative of the distance between the GNSS receiver and the satellite assuming the navigation time signal matches the global time signal.

In addition to obtaining spatial positioning measurements, the GNSS receiver can also obtain timing information. For example, if the GNSS receiver obtains four or more pseudorange measurements to different satellites, not only can the three-dimensional coordinates of the GNSS receiver be determined by trilateration using transmitted information about the satellite's positions and the pseudorange measurements, but the global time signal can also be accurately obtained through satellite measurements. This is typically performed by using the fourth pseudorange measurement to determine a time signal which, if substituted for the navigation time signal, would cause all psuedorange measurements to substantially agree. This time signal is taken as the global time signal. This is possible since the beginnings of the pseudorandom code sequences transmitted by each satellite are synchronized. Additional pseudorange measurements can be used to refine position and/or timing measurements, using estimation techniques as known in the art. In this case, measurements of the spatial position and/or global time signal are typically taken as measurements which best fit, according to some predetermined criteria, the received satellite signal information.

In an embodiment, the satellite signal receiver module is configured to determine the global time signal by determining a pseudorange to four or more satellites, then determining the global time signal by selecting from a range of possible global time signals, such that using the selected time signal as the navigation or global time signal would result in a substantially consistent set of pseudorange measurements giving a single location measurement with a predetermined degree of accuracy and precision.

In an embodiment, the satellite signal receiver module can use the navigation time signal to facilitate determination of a global time signal by using the navigation time signal to determine which satellites are currently visible and to prioritize a search for signals from said satellites. For example, only a portion of GNSS satellites such as GPS satellites are visible from a given position at a given time. Furthermore, the most accurate information can be obtained from those satellites which are neither too directly overhead nor too close to the horizon. Therefore, given an approximate location and accurate time information from the navigation time signal, a GNSS satellite signal receiver module can predict which satellite signals may be available, and prioritize a search for said signals based on expected accuracy of information, expected availability of signals, and the like.

In an embodiment, the satellite signal receiver module can use the navigation time signal to facilitate determination of a global time signal by using the navigation time signal as an initial estimate of the global time signal to initialize a signal receiving operation. For example, in determining a pseudorange measurement, a GNSS receiver such as a GPS receiver performs a time shifting operation on the locally generated pseudorandom code sequence to correlate it with a corresponding received pseudorandom code sequence. The duration of the time shifting operation can be significantly shortened if the navigation time signal is substantially synchronized with the global time signal, since an accurate initial estimate for the required time shift producing the desired correlation can be provided, thereby reducing the search range for this operation.

In an embodiment, if the navigation time signal is sufficiently synchronized with the global time signal, only three pseudorange measurements may be required in order to obtain an accurate position fix, for example through trilateration. However, additional pseudorange measurements can still be performed for various purposes, for example performing an update operation.

In an embodiment, knowledge of some elements of position, for example height above sea level, can also reduce the number of pseudorange measurements required in order to obtain an accurate position or time fix. Such information can also be used to reduce time taken for the navigation operation, for example by facilitating selection of satellite signals or influencing timing of locally generated pseudorandom code sequences.

After its acquisition, the determined global time signal is used to configure one or more adjustments, configured to facilitate future navigation operations. For example, future navigation operations, either immediately following the current operation or following an intervening time interval, can be facilitated by providing an accurate navigation time signal, or by using the global time signal to otherwise facilitate or expedite future navigation operations. The one or more adjustments can be configured or performed to facilitate such provisions.

In an embodiment, the navigation interface module is configured to determine one or more differences between the host time signal and the global time signal, by comparing observations of the global time signal with observations of the host time signal. Based on one or more such comparisons, a time derivation procedure can be established which derives the navigation time signal from the host time signal in a manner which is expected to improve accuracy of the navigation time signal, for example to facilitate substantial synchronicity between the navigation time signal and the global time signal. For example, the time derivation procedure can be used to compensate for accumulated clock inaccuracies due for example to clock drift, offsets such as due to clock skew, power events, temperature variations, component variations, clock adjustment events, or the like.

For example, in an embodiment of the present invention, determined differences between the host time signal and the global time signal can be represented by a polynomial equation:

$$h(t) = a_0 + a_1 t + a_2 t^2 + a_3 t^3 + \quad (1)$$

where t represents time according to the global time signal, h(t) represents time according to the host time signal, and $a_0, a_1, a_2, a_3, \ldots$ are parameters determined through one or more comparisons between the observed host time signal and the observed global time signal. For example, $a_0$ can represent a constant offset between host time signal and the global time signal, such as related to clock skew between the host real time clock and the GNSS, whereas $a_1$ can represent a constant drift factor of the host time signal relative to the global time signal. Higher order terms can be used to model more complex clock inaccuracies, although it is understood that typically h(t) is an increasing function. The host time signal and the global time signal can be considered substantially synchronized if $h(t) \approx t$. Other representations, for example using other periodic, transcendental, analytic, non-analytic, or other functions, look-up tables, frequency domain or other transform-domain representations, or the like, can be used as an alternative to the polynomial equation (1).

In an embodiment, differences between the host time signal and the global time signal can be measured by periodically comparing the host time signal to a reference signal such as the global time signal, and measuring errors or inaccuracies in the host time signal by linear or nonlinear interpolation, regression analysis, least squares, recursive least squares, filtering such as Kalman or particle filtering, or other methods as would be understood by a worker skilled in the art. For example, the parameters of Expression (1) can be measured by multiple comparisons and applications of such filtering or estimation techniques.

In an embodiment, the navigation interface module comprises a time signal adjustment module configured to derive the navigation time signal from the host time signal, according to the currently specified and parameterized time derivation procedure. For example, the navigation interface module can model differences between the host time signal and the global time signal according to the representation of Expression (1), with parameters $a_0, a_1, a_2, a_3, \ldots$ determined as discussed above. For h(t) an increasing function, a time derivation procedure typically amounts to evaluating the inverse $h^{-1}(s)$ at specified values of s which represent the host time signal. That is, if according to the host time signal the time at an instant is given by value s, then the time derivation procedure determines a corresponding value t which satisfies h(t)=s. A worker skilled in the art would understand the various techniques for efficiently determining or approximately evaluating such a corresponding value. A discrete or continuous sequence of values derived in such a manner comprise the navigation time signal, which can be considered a substantially "corrected" time signal in this embodiment of the present invention.

In an embodiment, the navigation interface module is configured to provide the host computer system or host computer module with an update signal during an update operation. For example, the navigation interface update module of the GNSS receiver apparatus can route an update signal indicative of the global time signal or other relevant timing information through an interface to the host computer system during the update operation, either periodically or in response to a request such as generated by the GNSS receiver apparatus or the host computer system. The update signal can be representative of the global time signal or measurements dependent thereon and is typically transmitted in accordance with the standards for the interface between the host computer system and the GNSS receiver apparatus. The update signal is useful for configuring one or more adjustments to facilitate synchronicity between the navigation time signal and the global time signal. For example, the update signal can be used to facilitate adjustment of the host real time clock such that the host time signal (upon which the navigation time signal can be based) is substantially synchronized with the global time signal, or is otherwise adjusted, for example to provide a host time signal or navigation time signal useful for future navigation operations. Other aspects related to the host real time clock on board the host computer system can also be adjusted.

Host Computer Module

In an embodiment, the present invention provides for a host computer module, for example including hardware or software operating on or with the host computer system, the host computer module being configured to interface with the host real time clock and with the navigation interface module. The host computer module provides for enhanced interaction between the host computer system and the GNSS receiver apparatus.

In an embodiment, the host computer module is configured to interface with the host real time clock to substantially synchronize the host time signal thereof with the global time signal. For this purpose, the host computer module can be configured to receive a signal representative of the global time signal from the navigation interface module, through the interface between the host computer system and the GNSS receiver apparatus.

In an embodiment, the host computer module is configured to adjust the host real time clock, either directly or through a clock gateway module. For example, the host computer module can be configured to access a memory location or hardware or software counter indicative of the current state of the host real time clock, and update the memory location or counter in a manner that updates the host real time clock such that the host time signal is substantially synchronized with the global time signal, as provided to the host computer module by the host time update module. In a further embodiment, the host computer module first reads the current state of the host real time clock in order to facilitate or record the update process.

In an embodiment, updating of the host real time clock takes a measurable variable or fixed amount of time to complete, thereby possibly rendering the signal indicative of the global time signal outdated by the time the memory location or counter update is performed. For this purpose, the host computer module can be configured to correct for any delays by advancing the value to be written into the memory location or counter by an amount selected to compensate for the variable or fixed delay. In the case of variable delay, factors determining the variation in a predetermined fashion can be measured to determine the amount of variable delay.

The modules, systems, and other components of the present invention, for example the host real time clock, host time acquisition module, satellite signal receiver module, host time update module, host computer module, and the like, can be provided, coupled, or integrated in a variety of ways. For example, modules, systems or components can include dedicated hardware (for example electronics components), shared hardware between two or more modules, systems or components, or a combination of dedicated and shared hardware. Modules, systems or components can also include dedicated software or firmware, shared software or firmware between two or more modules, systems or components, or a combination of dedicated and shared software or firmware. Furthermore, the software or firmware can be executed by dedicated processing devices, shared processing devices between two or more modules, systems or components, or a combination of dedicated and shared processing devices to provide the desired functionality of the present invention. All or a portion of the functionality of the modules, systems, and components can optionally be managed by one or more operating systems, hardware systems, communication network controllers, or other systems as would be understood by a worker skilled in the art.

Figure 2:
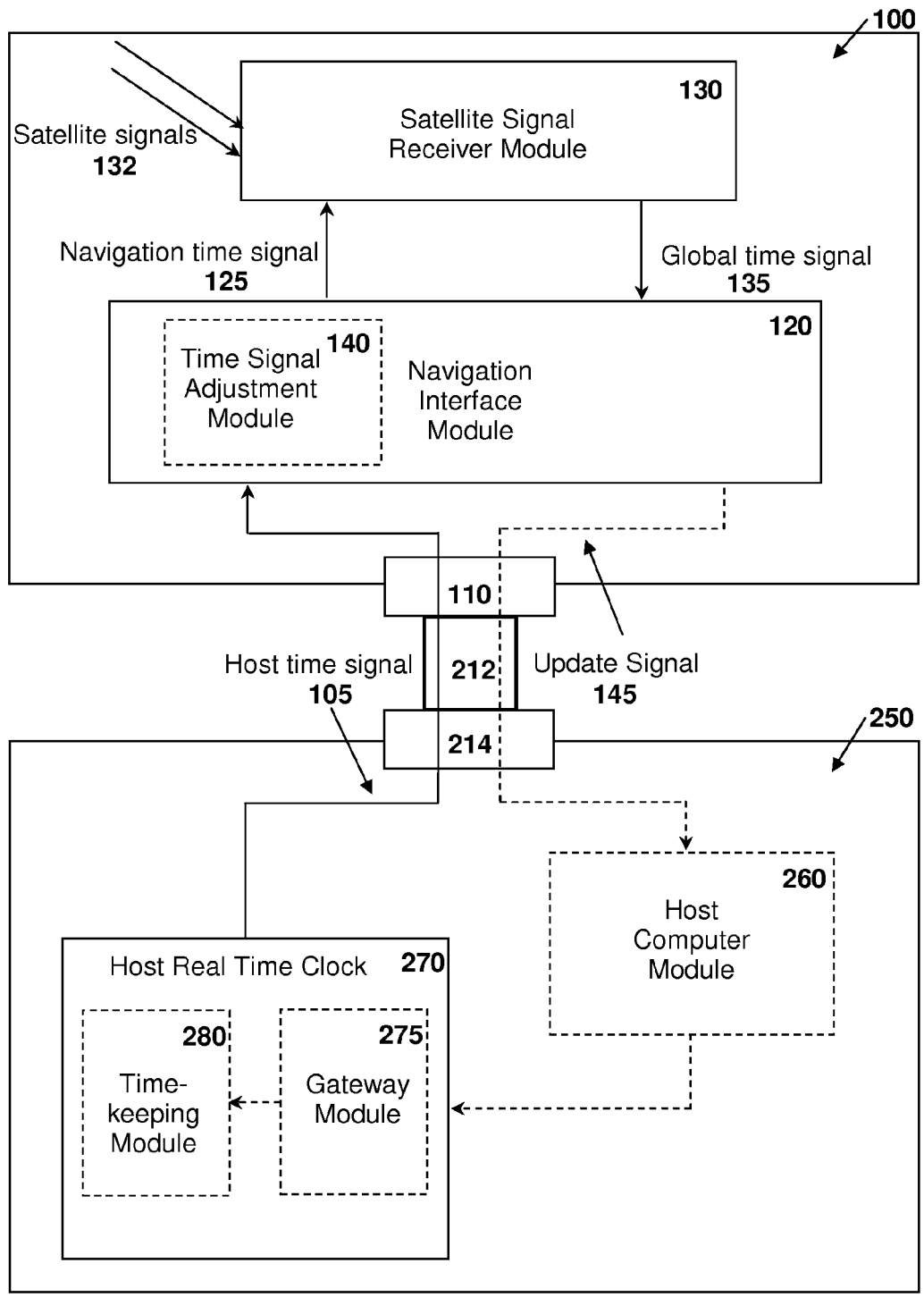
FIG. 2 illustrates a GNSS-enabled system according to another embodiment of the present invention.

For example, referring to FIG. 2, in an embodiment, the host computer module 260, host real time clock 270, timekeeping module 280, gateway module 275 and data interface port 214 on the host computer system 250 can optionally share some hardware resources, such as a host system central processing unit (CPU) and power supply, while also each having dedicated hardware resources, such as clock circuitry and data interface circuitry. As another example, the host real time clock 270 and network interface port 214 can also have substantially separate firmware for operation thereof, while also being supported by common firmware such as a BIOS. As yet another example, each of the host computer module 260, host real time clock 270, timekeeping module 280, gateway module 275 and data interface port 214 can operate in accordance with the present invention using a combination of dedicated modular software units (for example drivers) within a larger software system such as an operating system. Other computer architectures would be understood by a worker skilled in the art.

Continuing with reference to FIG. 2, in an embodiment, the navigation interface module, 120, satellite signal receiver module 130, time signal adjustment module 140, and data interface port 110 of the receiver apparatus 100 can optionally share some hardware, software and firmware resources either with each other or with the host computer system 250. For example, the receiver apparatus 100 can include a common processor used by multiple modules, or the satellite signal receiver module may use a dedicated processor. Instructions for software or firmware can reside on the receiver apparatus 100 (in dedicated or shared memory), the host computer system 250, or a combination thereof. For example, the host computer system 250 can transmit software agents to the receiver apparatus 100 to execute some functions thereon, as is known in the art. Updates to software or firmware of the various modules of the receiver apparatus 100 can optionally be initiated by sending information from the host computer system 250. Modules of the receiver apparatus 100 can also optionally use processing devices on board the host computer system 250. Furthermore, portions of the navigation interface module 120 can be closely coupled with portions of the satellite signal receiver module 130, in order to facilitate transmission and manipulation of the navigation time signal 125. Other variations of configuration of modules, systems or components of the present invention would be understood by a worker skilled in the art.

The invention will now be described with reference to specific examples. It will be understood that the following examples are intended to describe embodiments of the invention and are not intended to limit the invention in any way.

EXAMPLES

Example 1

FIG. 1 illustrates a GNSS receiver apparatus 100 such as a plug-in GPS receiver card for coupling with a host computer system such as a laptop, PDA, automobile computer, cell phone, etc. according to an embodiment of the present invention. The receiver apparatus 100 is configured to receive a host time signal 105 from the host computer system through a data interface port 110. The data interface port 110 can also pass other signals related to operation of the GNSS receiver apparatus 100, such as position information, as well as power and ground lines from the host computer system. During a navigation operation, the host time signal 105 from the host computer system is supplied to a navigation interface module 120, which is configured to receive the host time signal. The navigation interface module 120 can also perform tasks such as requesting the host time signal 105 from the host computer system, supplying a navigation time signal 125 to the satellite signal receiver module 130, deriving the navigation time signal based on at least the host time signal, receiving a global time signal 135 from the satellite signal receiver module 130, and supplying an update signal 145 to the host computer system.

Continuing with reference to FIG. 1, during the navigation operation the satellite signal receiver module 130 is configured to receive satellite signals 132, for example from GPS satellites, and interpret these signals in order to determine both position information and a global time signal, for example according to standard GPS operations as would be readily understood by a worker skilled in the art. The global time signal is indicative of time kept by mutually synchronized clocks aboard the GPS satellites. The satellite signal receiver module 130 is configured such that a navigation time signal, when substantially synchronized with the global time signal, can reduce the time taken by the satellite signal receiver module 130 to determine the global time signal. For example, an accurate navigation time signal can lead to accurate positioning information of the satellites and an accurate prediction of the phase or start time of pseudorandom signals transmitted by GPS satellites.

Continuing with reference to FIG. 1, the satellite signal receiver module 130 is configured to supply the global time signal 135, acquired during the navigation operation, to the navigation interface module 120 during an update operation. The navigation interface module is configured to use at least the global time signal to configure one or more adjustments during the update operation. These one or more adjustments are configured to facilitate future navigation operations, for example by facilitating substantial synchronicity between the navigation time signal and the global time signal.

In an embodiment, the navigation interface module 120 is configured to use the global time signal to configure one or more adjustments, configured to facilitate future navigation operations, for example by facilitating substantial synchronicity between the navigation time signal and the global time signal. In a further embodiment, this is performed with the aid of an optional time signal adjustment module 140.

In an embodiment, the navigation interface module 120 is configured to supply an update signal 145 to the host computer system through the data interface port 110. For example, the update signal 145 can be indicative of the global time signal 135. The update signal 145 is then used to adjust the host real time clock in order to substantially synchronize the host time signal 105 and the global time signal 145. In this manner, the host time signal 105 supplied to the GNSS receiver apparatus 100 in future acquisition operations is made more accurate for use in future satellite signal reception operations.

Example 2

FIG. 2 illustrates a GNSS-enabled system including a GNSS receiver apparatus 100 such as a plug-in GPS receiver card coupled to a host computer system 250 such as a laptop, PDA, automobile computer, cell phone, etc. according to an embodiment of the present invention. The receiver apparatus 100 is configured to receive a host time signal 105 from the host computer system 250 through a data interface port 110, which receives the signal from the host computer system 250 through a data link 212 connecting the data interface port 110 to a corresponding data interface port 214 on the host computer system 250. The data interface port 110 can also pass other signals related to operation of the GNSS receiver apparatus 100, such as position information, as well as power and ground lines from the host computer system 250. Other operations of the GNSS receiver apparatus 100 are as described in Example 1.

Continuing with reference to FIG. 2, in an embodiment, the navigation interface module 120 is configured to supply an update signal 145 to the host computer system 250 through the data interface port 110. For example, the update signal 145 can be indicative of the global time signal 135. The update signal passes through the data interface port 110, through a data link 212, and through a corresponding data interface port 214 of the host computer system 250. A host computer module 260 receives the update signal 145 and is configured to adjust the host real time clock 270 to substantially synchronize the host time signal and the global time signal 245 during the update operation. In embodiments of the present example, the host real time clock 270 can include a gateway module 275 and a timekeeping module 280. The timekeeping module 280 can include a hardware circuit, such as a crystal oscillator coupled to a series of ripple counters, as would be understood by a worker skilled in the art. The gateway module can include an interface to the timekeeping module 280, and can optionally perform as a separate interface for different hardware or software systems adjusting the host real time clock, such that adjustments from systems other than the GNSS receiver apparatus and host computer module do not substantially impact the synchronization of the host time signal to the global time signal as seen by the GNSS receiver apparatus.

Example 3

Figure 3:
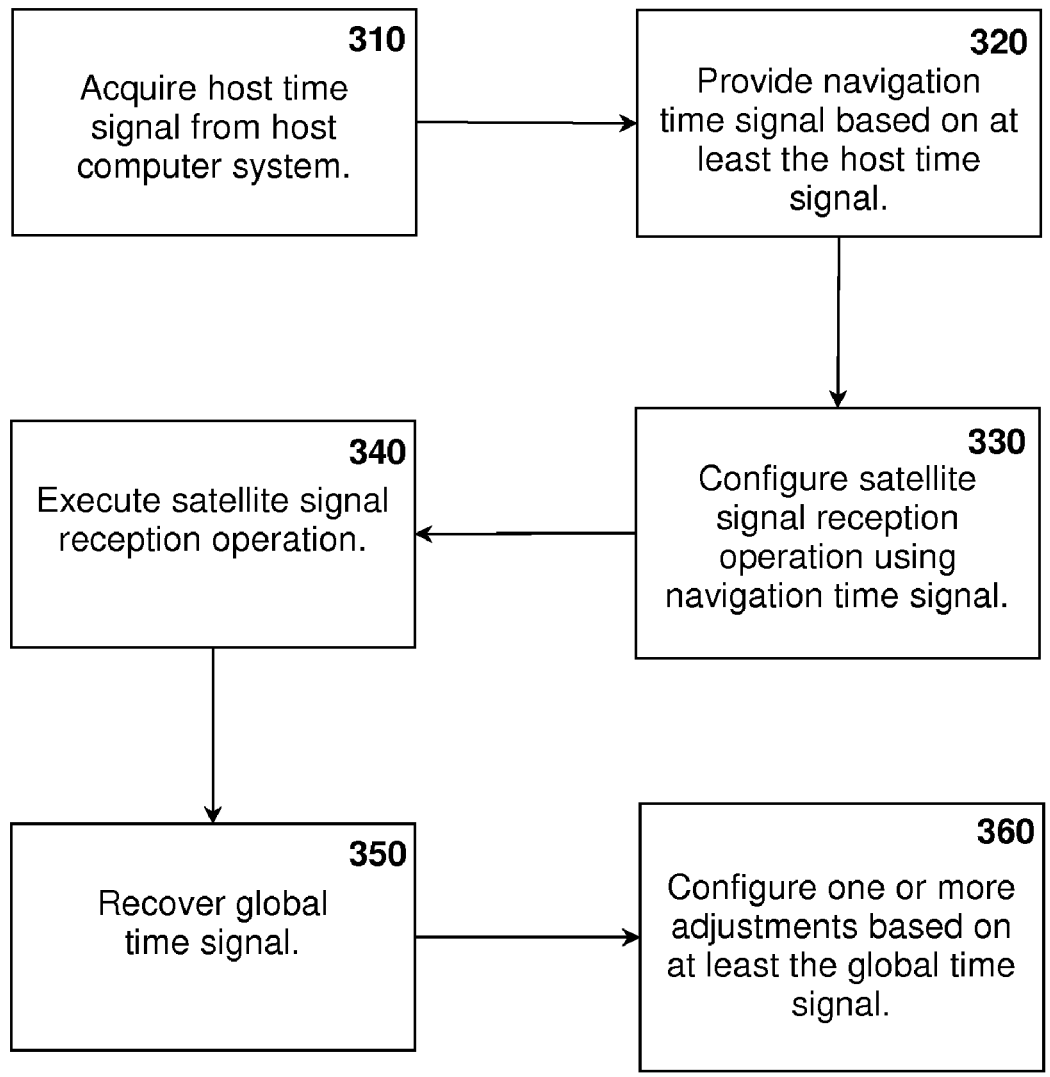
FIG. 3 illustrates a method for operating a GNSS receiver apparatus according to an embodiment of the present invention.

FIG. 3 illustrates a method for operating a GNSS receiver apparatus according to an embodiment of the present invention. In an initial step 310, the GNSS receiver apparatus acquires a host time signal from the host computer system. The host time signal can be acquired by sending a request to the host computer system, or by periodically or continuously reading a signal transmitted by the host computer system indicative of the host time signal. In the next step 320, the GNSS receiver apparatus provides a navigation time signal based on at least the host time signal. For example, the navigation time signal can be a substantial replica of the host time signal if the host time signal is considered accurate, or it can be an adjusted version of the host time signal configured to reduce timing inaccuracies based on information about the host real time clock accuracy, drift, etc. In the next step 330, the GNSS receiver apparatus configures a satellite signal reception operation using the navigation time signal. The navigation time signal is used to reduce the time taken by the satellite signal reception operation, as discussed previously. In the next step, 340, the satellite signal reception operation is executed by the GNSS receiver apparatus, for example by observing and correlating locally generated and time shifted pseudorandom sequences based on the host time signal with corresponding pseudorandom sequences received from the satellites to determine a position fix and timing information from the satellites. In the next step 350, the timing information determined in step 330 is used to recover a global time signal, indicative of a global time kept by the satellites. In step 360, the global time signal is used to configure one or more adjustments based on at least the global time signal, the one or more adjustments configured to facilitate future navigation operations. For example, future navigation operations can be facilitated by facilitating substantial synchronicity between the navigation time signal and the global time signal. For example, the one or more adjustments can include adjusting the host real time clock of the host computer system to substantially synchronize the host time signal and the global time signal, and providing the navigation time signal based substantially on the host time signal. As another example, the one or more adjustments can include adjusting parameters of a time signal adjustment operation by which the navigation time signal is derived from the host time signal based on prior collected information about the host time signal and corrective measures which can be taken thereupon to improve time signal accuracy. For example, clock skew, clock drift, extraneous clock adjustments, or other sources of time signal inaccuracy can be monitored and corrective measures can be taken.

Example 4

Figure 4:
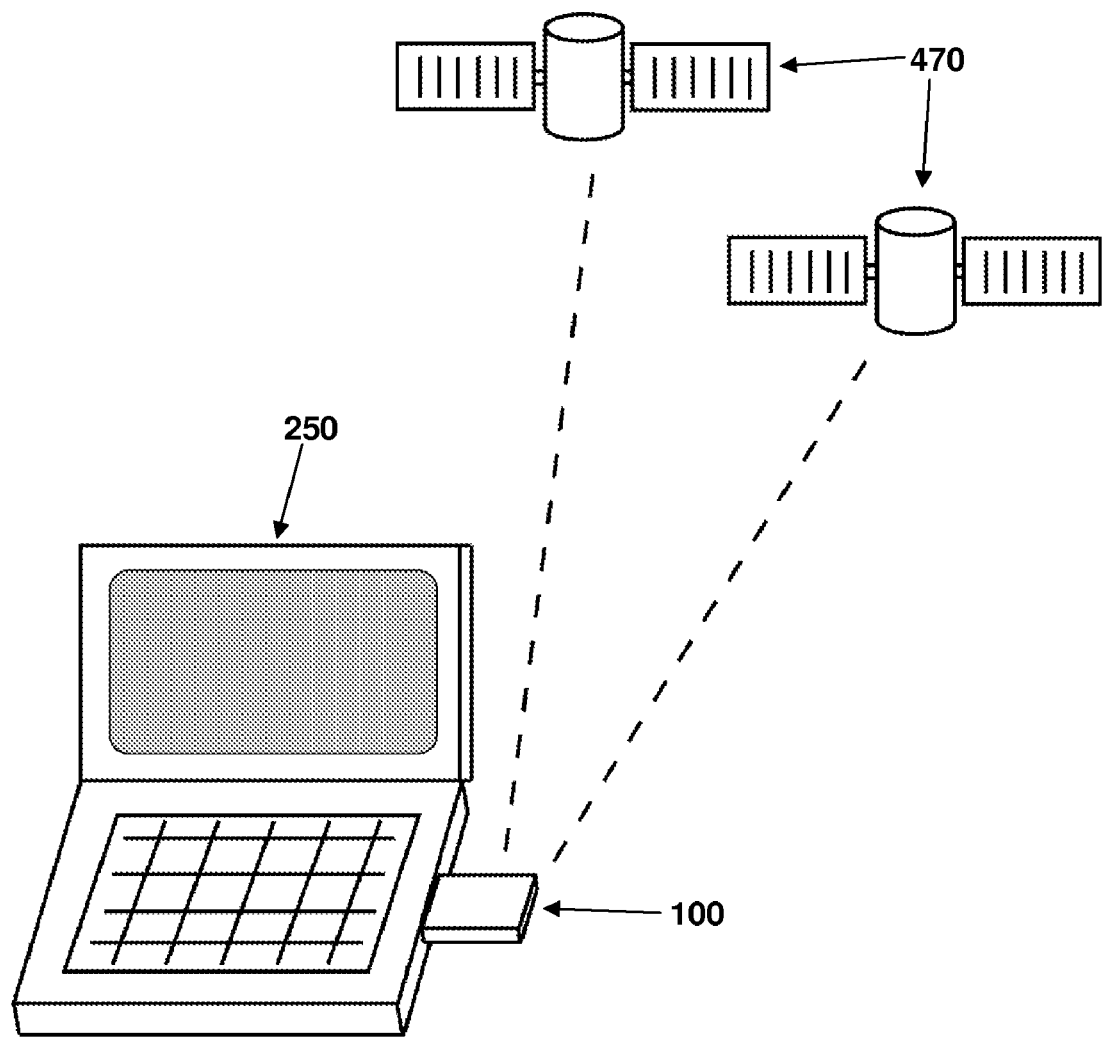
FIG. 4 illustrates an apparatus including a GNSS receiver coupled to a host computer system according to an embodiment of the present invention.

FIG. 4 illustrates a GNSS-enabled system including a plug-in card type GNSS receiver apparatus 100 operatively coupled to a host computer laptop system 250 according to an embodiment of the present invention. The plug-in connection can be a PCMCIA™ connection, CardBus™ connection, PC Card™ connection, ExpressCard™ connection, USB™ connection, FIREWIRE™ connection, or other plug-in connection as would be understood by a worker skilled in the art. The GNSS receiver apparatus 100 observes signals from satellites 470 to facilitate determination of a global time signal. It will be apparent to a worker skilled in the art that other connectivity configurations between host computer system and GNSS receiver apparatus are possible. For example, a wired connection comprising a USB™ or FIREWIRE™ or other cable can be used, as can wireless connections such as facilitated by Bluetooth™, IEEE 802.11, ZigBee™, IEEE 802.15.4, and the like. Moreover, the host computer system is not limited to a laptop, but can be any computer system or PDA, cellular phone, or other electronic device capable of providing a real time clock signal, as would be understood by a worker skilled in the art.

Example 5

Figure 5:
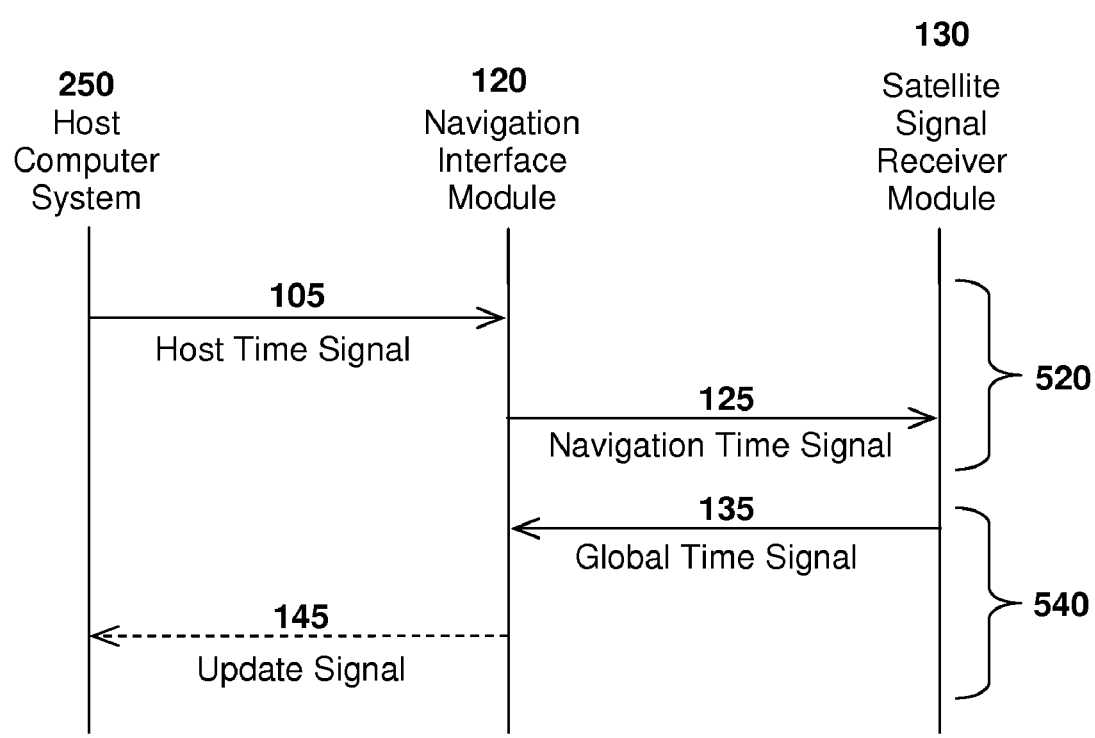
FIG. 5 illustrates the timing sequence of operations according to an embodiment of the present invention.

FIG. 5 illustrates the timing sequence of signals between the host computer system 250, navigation interface module 120 and satellite signal receiver module 130 according to an embodiment of the present invention.

As illustrated in FIG. 5, during a navigation operation 520, a host time signal 105 is provided by the host computer system 250 to the navigation interface module 120. The navigation interface module 120 then provides a navigation time signal 125 to the satellite signal receiver module 130 based on the host time signal. This can involve processing of the host time signal 105. The satellite signal receiver module 130 then uses the navigation time signal 125 to facilitate determination of a global time signal 135, via reception of satellite signals.

As further illustrated in FIG. 5, during an update operation 540, the global time signal 135 is provided by the satellite signal receiver module 130 to the navigation interface module 120. The global time signal 135 may be used to configure one or more adjustments at the navigation interface module 120. Optionally, an update signal 145 can be provided from the navigation interface module 120 to the host computer system 250, the update signal facilitating one or more adjustments of modules of the host computer system 250.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

For example, in embodiments of the present invention, all or portions of the host computer module, clock gateway module, and/or timekeeping module can be provided by configuring components of a general purpose computer using a computer program product or software, for example provided to operate with hardware such as the GNSS receiver apparatus.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like and pursuant to one or more, or a part of one or more, program elements, modules or objects generated from any programming language, such as C++, Java, P1/1, or the like. In addition, each step, or a file or object or the like implementing each said step, may be executed by special purpose hardware or a circuit module designed for that purpose.

It is clear that the described embodiments of the invention are exemplary and can be varied in many ways. Such variations are not to be regarded as a departure from the spirit and scope of the invention, and all such variations, as would be obvious in the art, are intended to be included within the scope of the following claims.

I claim:

1. A global navigation satellite system receiver apparatus configured for operative coupling to a host computer system, the global navigation satellite system receiver apparatus comprising:

a) a navigation interface module configured to receive a host time signal from the host computer system during a navigation operation, the navigation interface module further configured to provide a navigation time signal based on at least the host time signal during said navigation operation, wherein the host time signal comprises a first indication of time in a first prespecified format, and wherein the navigation time signal comprises a second indication of time in the first prespecified format or a second prespecified format based at least in part on the first indication of time; and b) a satellite signal receiver module configured to use the navigation time signal to facilitate determination of a global time signal through reception of satellite signals during said navigation operation;

wherein the global time signal is provided to the navigation interface module during an update operation, the navigation interface module configured to use at least the global time signal to configure one or more adjustments during said update operation, said one or more adjustments configured to facilitate future navigation operations.

2. The apparatus of claim 1, wherein the host time signal is provided by a host real time clock of the host computer system.

3. The apparatus of claim 2, wherein the one or more adjustments during the update operation include an adjustment of the host real time clock.

4. The apparatus of claim 2, further comprising a clock gateway module of the host real time clock, the clock gateway module configured to manage one or more adjustments to the host real time clock, the one or more adjustments to the host real time clock provided by one or more sources.

5. The apparatus of claim 4, wherein the clock gateway module is further configured to provide one or more application specific host time signals, wherein each application specific host time signal is independent.

6. The apparatus of claim 1, the apparatus further comprising a host computer module of the host computer system, the host computer module configured to facilitate the one or more adjustments during the update operation.

7. The apparatus of claim 1, wherein the one or more adjustments during the update operation are configured to facilitate synchronicity between the navigation time signal and the global time signal.

8. The apparatus of claim 2, wherein the navigation time signal is generated at least in part based on information about the host real time clock, said information selected from the group comprising: clock accuracy, clock drift, clock skew, power events, temperature variation, component variation, and clock adjustment events.

9. A global navigation satellite system receiver apparatus configured for operative coupling to a host computer system, the global navigation satellite system receiver apparatus comprising:
   a) a navigation interface module configured to receive a host time signal from the host computer system during a navigation operation, the navigation interface module further configured to provide a navigation time signal based on at least the host time signal during said navigation operation; and
   b) a satellite signal receiver module configured to use the navigation time signal to facilitate determination of a global time signal through reception of satellite signals during said navigation operation;
   wherein the global time signal is provided to the navigation interface module during an update operation, the navigation interface module configured to use at least the global time signal to configure one or more adjustments during said update operation, said one or more adjustments configured to facilitate future navigation operations, and wherein the navigation interface module further comprises a time signal adjustment module, the time signal adjustment module configured to derive the navigation time signal from the host time signal based on a parameterized time derivation procedure.

10. The apparatus of claim 9, wherein the one or more adjustments configured during the update operation include an adjustment to the one or more parameters of the parameterized time derivation procedure.

11. The apparatus of claim 9, wherein the host time signal is provided by a host real time clock of the host computer system.

12. The apparatus of claim 11, wherein the one or more adjustments during the update operation include an adjustment of the host real time clock.

13. The apparatus of claim 11, further comprising a clock gateway module of the host real time clock, the clock gateway module configured to manage one or more adjustments to the host real time clock, the one or more adjustments to the host real time clock provided by one or more sources.

14. The apparatus of claim 13, wherein the clock gateway module is further configured to provide one or more application specific host time signals, wherein each application specific host time signal is independent.

15. The apparatus of claim 9, the apparatus further comprising a host computer module of the host computer system, the host computer module configured to facilitate the one or more adjustments during the update operation.

16. The apparatus of claim 9, wherein the one or more adjustments during the update operation are configured to facilitate synchronicity between the navigation time signal and the global time signal.

17. The apparatus of claim 11, wherein the navigation time signal is generated at least in part based on information about the host real time clock, said information selected from the group comprising: clock accuracy, clock drift, clock skew, power events, temperature variation, component variation, and clock adjustment events.

18. A method of operating a global navigation satellite system receiver apparatus operatively coupled to a host computer system, the method comprising:
   a) performing a navigation operation, the navigation operation comprising:
      i) providing a navigation time signal based on at least a host time signal from the host computer, wherein the host time signal comprises a first indication of time in a first prespecified format, and wherein the navigation time signal comprises a second indication of time in the first prespecified format or a second prespecified format based at least in part on the first indication of time;
      ii) using the navigation time signal to perform a satellite signal reception operation; and
      iii) determining a global time signal at least in part based on information obtained from the satellite signal reception operation; and
   b) using at least the global time signal to perform one or more adjustments to facilitate future navigation operations.

19. The method of claim 18, wherein the host time signal is provided by a host real time clock of the host computer system.

20. The method of claim 19, wherein the one or more adjustments include an adjustment of the host real time clock.

21. The method of claim 19, wherein the host real time clock services one or more auxiliary applications and wherein the method further comprising the step of: providing an application specific host time signal for each of the one or more auxiliary applications, wherein each application specific host time signal is independent of the host time signal.

22. The method of claim 18, wherein the one or more adjustments performed to facilitate future navigation operations facilitate synchronicity between the navigation time signal and the global time signal.

23. The method of claim 18, wherein providing the navigation time signal further comprises modifying the host time signal according to a modification schema, wherein the one or more adjustments include an adjustment to the modification schema.

24. The method of claim 23, wherein the modification schema is based at least in part on information selected from the group comprising: clock accuracy, clock drift, clock skew, power events, temperature variation, component variation, and clock adjustment events.

25. A method of operating a global navigation satellite system receiver apparatus operatively coupled to a host computer system, the method comprising:
   a) performing a navigation operation, the navigation operation comprising:
      i) providing a navigation time signal based on at least a host time signal from the host computer system;
      ii) using the navigation time signal to perform a satellite signal reception operation; and
      iii) determining a global time signal at least in part based on information obtained from the satellite signal reception operation; and
   b) using at least the global time signal to perform one or more adjustments to facilitate future navigation operations;
   wherein the navigation time signal is derived from the host time signal based on a parameterized time derivation procedure.

26. The method of claim 25, wherein the one or more adjustments performed to facilitate future navigation operations include an adjustment to the one or more parameters of the parameterized time derivation procedure.

27. The method of claim 25, wherein the host time signal is provided by a host real time clock of the host computer system.

28. The method of claim 27, wherein the one or more adjustments include an adjustment of the host real time clock.

29. The method of claim 27, wherein the host real time clock services one or more auxiliary applications and wherein the method further comprises the step of: providing an application specific host time signal for each of the one or more auxiliary applications, wherein each application specific host time signal is independent of the host time signal.

30. The method of claim 25, wherein the one or more adjustments performed to facilitate future navigation operations facilitate synchronicity between the navigation time signal and the global time signal.

31. The method of claim 25, wherein providing the navigation time signal further comprises modifying the host time signal according to a modification schema, wherein the one or more adjustments include an adjustment to the modification schema.

32. The method of claim 31, wherein the modification schema is based at least in part on information selected from the group comprising: clock accuracy, clock drift, clock skew, power events, temperature variation, component variation, and clock adjustment events.

33. A global navigation satellite system (GNSS) enabled system comprising:
   a) a host computer module operatively coupled to a host real time clock, the host real time clock configured to provide a host time signal; and
   b) a global navigation satellite system receiver apparatus operatively coupled to the host computer module, the global navigation satellite system receiver apparatus comprising:
      i) a navigation interface module configured to receive the host time signal during a navigation operation, the navigation interface module further configured to provide a navigation time signal based on at least the host time signal during said navigation operation, wherein the host time signal comprises a first indication of time in a first prespecified format, and wherein the navigation time signal comprises a second indication of time in the first prespecified format or a second prespecified format based at least in part on the first indication of time; and
      ii) a satellite signal receiver module configured to use the navigation time signal to facilitate determination of a global time signal through reception of satellite signals during said navigation operation;
   wherein the global time signal is provided to the navigation interface module during an update operation, the navigation interface module configured to use at least the global time signal to configure one or more adjustments during said update operation, said one or more adjustments configured to facilitate future navigation operations.

34. A global navigation satellite system (GNSS) enabled system comprising:
   a) a host computer module operatively coupled to a host real time clock, the host real time clock configured to provide a host time signal; and
   b) a global navigation satellite system receiver apparatus operatively coupled to the host computer module, the global navigation satellite system receiver apparatus comprising:
      i) a navigation interface module configured to receive the host time signal during a navigation operation, the navigation interface module further configured to provide a navigation time signal based on at least the host time signal during said navigation operation, wherein the navigation time signal is derived from the host time signal based on a parameterized time derivation procedure; and
      ii) a satellite signal receiver module configured to use the navigation time signal to facilitate determination of a global time signal through reception of satellite signals during said navigation operation;
   wherein the global time signal is provided to the navigation interface module during an update operation, the navigation interface module configured to use at least the global time signal to configure one or more adjustments during said update operation, said one or more adjustments configured to facilitate future navigation operations.

* * * * *